United States Patent [19]

Andoh et al.

[11] 4,433,472

[45] Feb. 28, 1984

[54] METHOD FOR MANUFACTURING A DYNAMOELECTRIC MACHINE

[75] Inventors: Tetsuji Andoh, Amagasaki; Shigeji Takagi, Nishinomiya; Takeshi Sakamoto, Minoo, all of Japan

[73] Assignee: Mitsubishi Denki Kabushiki Kaisha, Tokyo, Japan

[21] Appl. No.: 246,407

[22] Filed: Mar. 23, 1981

[30] Foreign Application Priority Data

Mar. 24, 1980 [JP] Japan .................. 55-39128[U]

[51] Int. Cl.³ .................................... H02K 15/02
[52] U.S. Cl. ............................... 29/596; 310/42; 310/89; 310/186; 310/218; 310/258
[58] Field of Search ............... 29/596, 606; 310/42, 310/186, 218, 254, 258, 89

[56] References Cited

U.S. PATENT DOCUMENTS

| | | | |
|---|---|---|---|
| 1,991,092 | 2/1935 | Hathaway | 310/218 |
| 2,169,100 | 8/1939 | Lange | 310/218 |
| 3,087,080 | 4/1963 | Isaacson | 29/596 X |
| 3,809,938 | 5/1974 | Sjoberg et al. | 29/596 X |
| 3,995,271 | 5/1976 | Boesel | 29/596 |
| 4,198,743 | 4/1980 | Stuber | 29/596 |

OTHER PUBLICATIONS

*The Direct Current Traction Motor;* by Lightband et al.; published by London Business Book, Ltd.; 1970; p. 388.

Primary Examiner—Carl E. Hall
Attorney, Agent, or Firm—Robert E. Burns; Emmanuel J. Lobato; Bruce L. Adams

[57] ABSTRACT

A method for manufacturing a dynamoelectric machine comprises the steps of manufacturing a magnetic frame of polygonal cross section by welding together at their respective ends a plurality of sides, some of which may include projections so that a required portion on each side is transected by the circumference of a circle or cylindrical plane of a radius of curvature equal to the distance between the longitudinally central axis of the dynamoelectric machine and a field device magnetic core mounting surface, of circularly machining the required portions on each internal face of the magnetic frame along the circumference of the aforementioned circle or cylindrical plane which transects the required portion on each side to form field device magnetic core mounting surfaces, of mounting field devices, either main pole field devices or interpole field devices, each comprising a magnetic core surrounded by a coil, on said field device magnetic core mounting surfaces, and of axially rotatably mounting an armature axially centrally of said magnetic frame of polygonal cross-section.

5 Claims, 6 Drawing Figures

FIG. 1
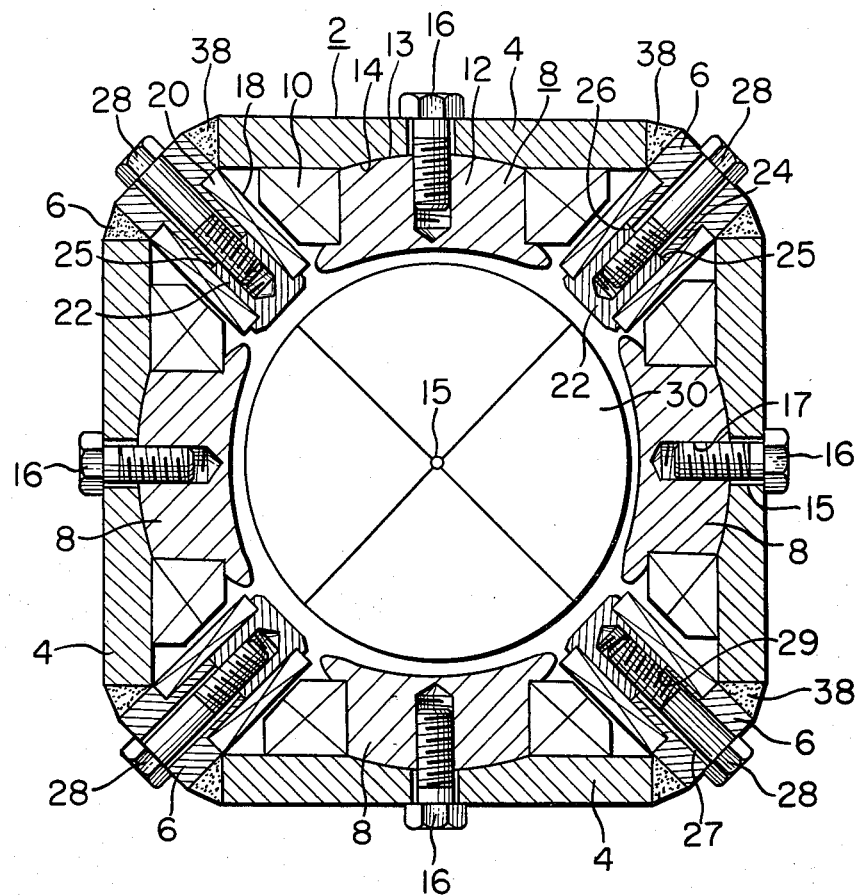
FIG. 3
FIG. 4
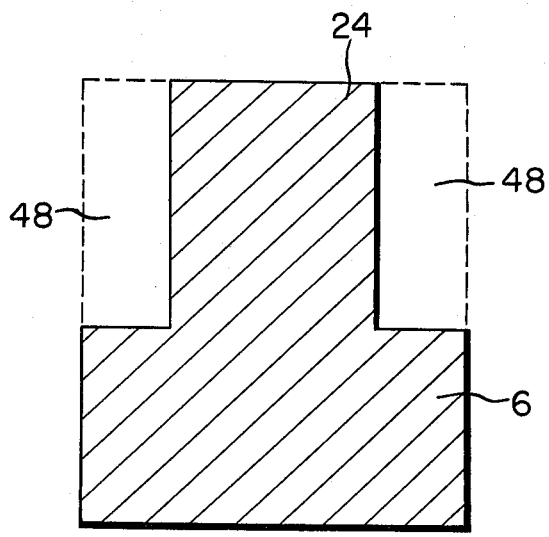

METHOD FOR MANUFACTURING A DYNAMOELECTRIC MACHINE

BACKGROUND OF THE INVENTION

This invention relates to a method for manufacturing dynamoelectric machines, and in particular relates to a method for manufacturing the magnetic frames for dynamoelectric machines.

More specifically, the present invention relates to a method for manufacturing the magnetic frames employed in dynamoelectic machines which are installed in electric vehicles of the low floor type, where the space available for installation is restricted, and so, to enable the required power output to be produced within that limited space, dynamoelectric machines of the type employing a tubular magnetic frame of polygonal cross-sectional configuration are generally used.

Typically dynamoelectric machines of the type employing a tubular magnetic frame of polygonal cross-sectional configuration, in their simplest form, have been constructed with a cross-sectionally polygonal tubular magnetic frame comprising a plurality of flat sides, to each of which is mounted a field device, such as a main pole field device or an interpole field device, each comprising a coil surrounding a magnetic core. Axially centrally of the magnetic frame is rotatably mounted an armature. In this simplest form dynamoelectric machine, the field devices are secured to smooth, regular, flat mounting surfaces machined on the respective sides of the polygonal magnetic frame, by mechanical means such as bolts which engage from outside the magnetic frame, through holes in the walls of the frame, with threaded holes formed in the respective field device magnetic cores, and which are tightened so as to hold the magnetic cores fast against the inner, mounting surfaces of the polygonal magnetic frame, for optimal magnetic contact between the magnetic cores and the magnetic frame.

To obtain the required degree of magnetic contact between the magnetic cores and the magnetic frame, and to ensure an accurate distance from the central axis of the dynamoelectric machine, it is the general practice to machine the inner field device mounting surfaces of the magnetic frame to provide substantially completely smooth, regular mounting surfaces at a precise distance from the central axis of the dynamoelectric machine. The field device magnetic cores themselves are generally made of stacked silicon steel plates, which plates are formed into the desired shape and size by stamping.

However, with the aforementioned simplest form dynamoelectric machine of the type with a polygonal tubular magnetic frame, the inner, mounting surfaces of the magnetic frame were flat, and the whole of the side had to be machined to provide the required smooth surface in the mounting area, thus requiring a considerable amount of time for the machining. Additionally, each side had to be machined individually, requiring time consuming repositioning and adjustment of the machining apparatus after the machining of each face. This added considerably to the overall time required for the machining operation, and also introduced the possibility of alignment errors during repositioning of the machining apparatus.

The prior art has, however, contemplated a reduction of the time required for machining the mounting surfaces by providing projections on the inner surfaces of the polygonal magnetic frame, which projections are smaller in area than the sides from which they project, and which form platforms or daises of suitable size for mounting the field device magnetic cores. With these projections, therefore, it became possible to reduce the time required for machining as only the mounting surfaces, the surfaces of the projections, needed to be machined.

These projections were, in the prior art, provided either by casting the polygonal magnetic frame as a unitary whole with integrally formed projections, or by manufacturing a polygonal tubular magnetic frame by welding together, at their respective ends, a number of flat sides, and then welding pieces to form projections to the respective sides.

The first mentioned of these methods of providing projections, however, had the considerable disadvantage that casting requires the use of a costly casting mold, thus adding substantially to the overall cost of the dynamoelectric machine. Additionally, disadvantages are to be found in that the casting process itself is a lengthy one.

And the second mentioned method of providing projections, although it eliminates the abovementioned disadvantages of costliness and time consumption of the first mentioned method using a casting mold, it introduces in their place the problem of structural distortions that develop as a result of the large number of welds that are necessary and the many places at which welding is carried out. Additionally, the number of welds involves the problem of time in the amount of time it takes to carry out a large number of welds.

Furthermore although the problem of machining time is reduced by means of providing projections, there still remains the difficulty of having to machine each individual surface separately, with a repositioning and realignment of the machining apparatus for each face, and the attendant possibility of alignment errors.

SUMMARY OF THE INVENTION

It is accordingly an object of the present invention to eliminate the various defects in the above described prior art.

It is another object of the present invention to present a method for manufacturing a dynamoelectric machine equipped with a tubular magnetic frame without using a casting mold and without producing structural distortions, and whereby the mounting surfaces for the field device magnetic cores can be machined easily, accurately, quickly, and hence, economically.

The abovementioned objects of the present invention are achieved according to this invention by manufacturing the tubular magnetic frame of the dynamoelectric machine so as to have a polygonal cross section made up of a plurality of flat sides which are either themselves internally transected by the circumference of a cylindrical plane centered on the central axis of the dynamoelectric machine, and of a radius equal to the distance from the longitudinal central axis of the dynamoelectric machine to a field device magnetic core mounting surface, or are provided, preferably integrally, with projections which are transected by the aforementioned circumference, whereby a single circular machining operation can machine around the required mounting surface portions of all of the sides of the magnetic frame, the sides of the polygonal magnetic frame being welded together, after which the aforementioned machining of the concave mounting surfaces on each of the sides or the projections therefrom is carried out. This arrangement of the tubular magnetic frame which allows machining to be carried out essentially in a single continuous circular machining operation is what affords the various advantages of economy, quickness and ease in the machining operation, while the single operation also increases overall machining accuracy as it does away with the need to reposition the machining apparatus for consecutive sides.

The objects of this invention may be further enhanced by welding the sides of the tubular magnetic frame together, avoiding the costs and time involved in casting, and not producing distortions, as the number of welds is thus minimized without the need to weld mounting surface projections onto each of the sides.

BRIEF DESCRIPTION OF THE DRAWINGS

Hereinbelow the present invention is explained in accordance with a preferred embodiment thereof, and with reference to the accompanying drawings, wherein:

FIG. 1 is a vertical sectional view of a dynamoelectric machine manufactured according to the method of the present invention;

FIGS. 3 and 4 show a short side member of the polygonal magnetic frame with an integrally formed projection as employed in a preferred embodiment of this invention, respectively in a cross-section and in a perspective view;

DESCRIPTION OF THE PREFERRED EMBODIMENT

Figure 2:
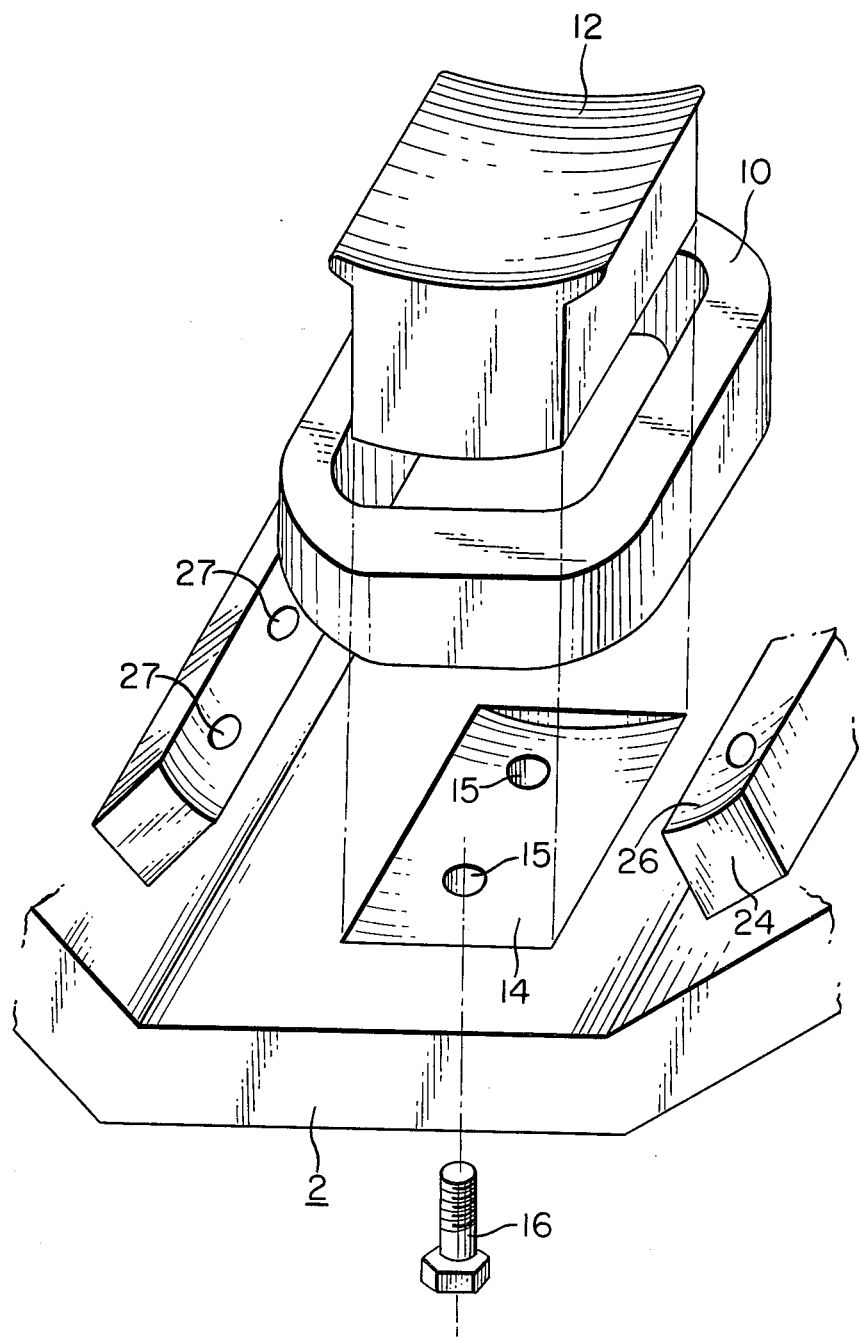
FIG. 2 is an exploded perspective view showing a portion of the dynamoelectric machine of FIG. 1.
Figure 6:
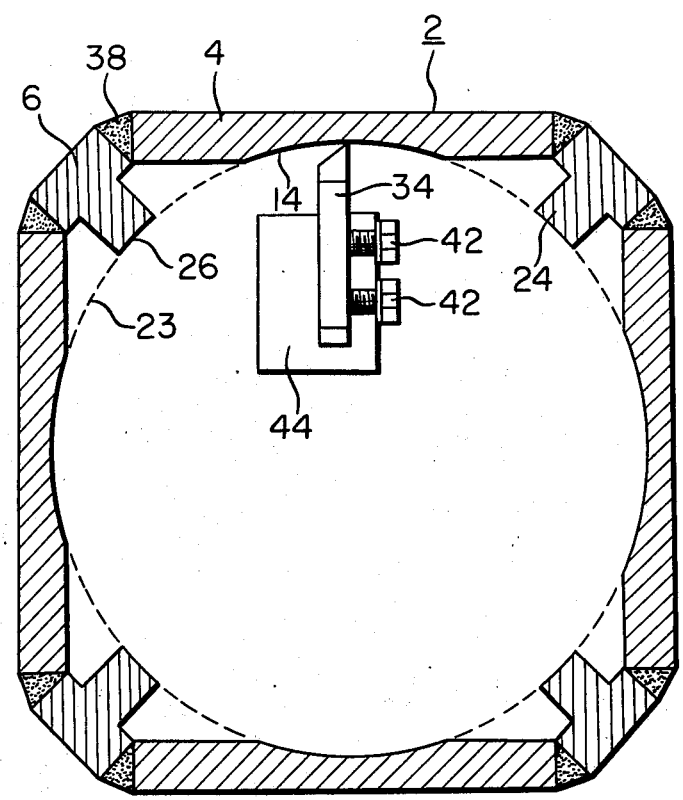
FIG. 6 is a diagrammatic depiction of the same state as depicted in FIG. 5, but seen from a point looking along the longitudinal axis of the dynamoelectric machine with the magnetic frame in section in a plane cut at right angles to the asis.

FIG. 1 shows a dynamoelectric machine manufactured according to the method of the present invention, with a tubular magnetic frame 2 of polygonal (in the illustrated embodiment, octagonal) cross-sectional configuration, comprising four substantially equal length relatively long sides 4 and four substantially equal length relatively short sides 6 arranged to provide two parallel pairs each of said long sides 4 and said short sides 6 with the two pairs of long sides 4 positioned such that the pairs form an angle of substantially 90° to each other, and with the two pairs of short sides 6 likewise positioned such that the pairs form an angle of substantially 90° to each other, with the long side 4 and short side 6 pairs being arranged such that the respective ends of a short side 6 adjoin to the adjacent ends of two long sides 4 such that the eight sides are consecutively joined together by a suitable mechanical means such as welds 38 to form a continuous parallel sided nonequilateral octagon wherein the angle contained between two adjacent sides is substantially 135°. Fixed via bolts 16 to each of the long sides 4 of the magnetic frame are main pole field devices 8, each comprising a coil 10 surrounding a magnetic core 12, as shown in FIG. 2, with the magnetic core 12 shaped with a curvature on its radially outward surface 13 which is the same as the curvature of a concave arcuate mounting surface 14 machined in the long sides to provide a regular smooth surface at a precise distance from a longitudinal central axis 15 of the machine to allow good magnetic contact for the magnetic core 12. The concave arcuate mounting surfaces 14 machined in the long sides 4 all form arcuate planes with the same radius of curvature from the same central axis 15, and are therefore all parts of the same circumference or cylindrical plane 23 (FIG. 6). The short sides 6, which are not of themselves, transected by the circumference of a circle or cylindrical plane 23 of which the arcuate planes of the concave arcuate mounting surfaces 14 in the long sides 4 are a part, are provided with projections 24, preferably integrally formed from a single piece of metal, as seen in FIG. 3, with the unwanted and unnecessary portions 48 surrounding the projection 24 removed by such means as gas cutting, leaving a surrounding base-like portion, as seen in FIG. 4, which forms the side member 6 which is welded to the adjacent sides as a part of the polygonal magnetic frame. These projections 24 on the short sides 6 extend radially inwardly from the short sides 6 to present surfaces which are transected by said circumference or cylindrical plane 23, and which are machined to form concave arcuate mounting surfaces 26 to which are fixed, by means of bolts 28, interpole field devices 18, each of which comprises a coil 20 surrounding a magnetic core 22, with the magnetic core 22 shaped with a curvature on its radially outward surface 25 which is the same as the curvature of the concave arcuate mounting surface 26 machined in the projections 24 on the short sides 6 to provide a regular smooth surface at a precise distance from the central axis 15 to allow good magnetic contact for the interpole magnetic core 22. The concave arcuate mounting surfaces 26 machined in the projections 24 of the short sides 6 all form arcuate planes with the same radius of curvature from the same central axis 15 and are therefore all parts of the same circumference or cylindrical plane 23. Furthermore the arcuate planes formed by the concave arcuate mounting surfaces 14 on long sides 4 and the arcuate planes formed by the concave arcuate mounting surfaces 26 on the projections 24 on the short sides 6, are all formed with the same radius from the same central axis 15 and so they are all parts of the same circumference or cylindrical plane 23. Axially rotatably mounted at the axial center of the polygonal magnetic frame 2, which center is also the center from which the concave arcuate mounting surfaces 14 and 26 are machined with a constant radius of curvature, is an armature 30 of any suitable construction as known in the art.

Figure 5:
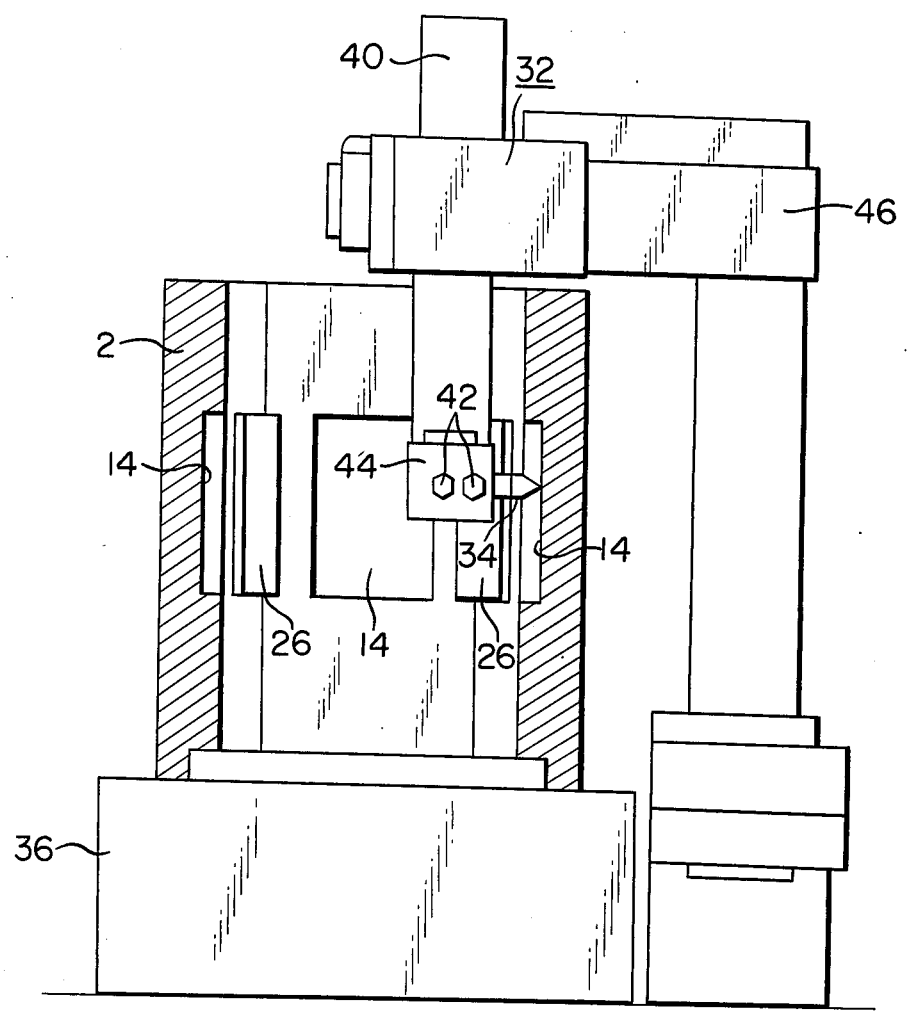
FIG. 5 is a diagrammatic depiction of the machining process, according to this invention, of the magnetic frame of the dynamoelectric machine with the magnetic frame seen in vertical section.

Since the concave arcuate mounting surfaces 14 and 26 are thus arranged to form a series of arcuate planes all with the same radius of curvature to the same central axis 15, thus placing each of the arcuate planes on the same continuous circumference or cylindrical plane 23, it is possible to machine all of these surfaces easily, accurately, and quickly for a smooth, regular surface, by means of a circular machining operation, as shown in FIGS. 5 and 6.

In FIG. 5 the machining operation is shown with the dynamoelectric machine in vertical section along its longitudinal axis. In the Figure, the cutting bit 34 of a vertical lathe 32 machines the concave arcuate surfaces 14 and 26 on the relatively long sides and the projections of the relatively short sides, respectively, of the magnetic frame 2 while this is held and rotated by a chuck 36.

FIG. 6 shows the same apparatus in section as viewed along the axis of the dynamoelectric machine, and illustrates, by means of the broken lines connecting the arcuate surfaces of the mounting surfaces 14 and 26, the circular path or cylindrical plane 23 along which the cutting bit 34 of the vertical lathe 32 machines, which circular path or cylindrical plane 23 is the circumference or cylindrical plane 23 of which the arcuate planes of the mounting surfaces 14 and 26 are parts.

In the machining device of FIGS. 5 and 6, the surfaces are machined by rigidly securing the preconstructed magnetic frame 2 on the chuck 36, lowering the cutting bit 34 support arm 40 together with the cutting bit 34 into the interior of the magnetic frame 2, adjusting the machining radius by adjusting the position of the cutting bit 34 held in the cutting head 44 by the cutting bit clamping bolts 42, so that the cutting bit 34 machines along the cylindrical plane 23. Machining is then carried out by rotating the magnetic frame 2, by rotating the chuck 36 on which it is mounted, relative to the cutting bit 34. The cutting bit 34 is also moved vertically, either up or down, or in both directions alternately, through a desired range, in synchronization with the rotation of the chuck 36, driving the cutting bit 34 support arm 40 in the relevant direction in the support tower 46, by means of a suitable synchronized drive means such as a gear connection to the rotating chuck 36. Machining according to this apparatus allows the entire machining operation with regard to the internal magnetic core mounting surfaces 14 and 26 of the magnetic frame 2 to be carried out as one single continuous operation.

The main pole magnetic cores 12 and the interpole magnetic cores 22 are generally formed by stacking a plurality of plates, generally of silicon steel, stamped in shapes which are a uniform cross-section of the magnetic cores 12 and 22, namely, in the embodiment, the shapes as seen in cross-section in FIG. 1, and by manufacturing thus it is matter of course to manufacture the magnetic cores 12 and 22 to have the required curvature on their convex arcuate radially outer surfaces 13 and 25, the surfaces which are placed in contact with the concave arcuate mounting surfaces 14 and 26 machined in the long sides 4 and the projections 24 of the short sides 2, respectively. Thus it is easily possible to provide the required magnetic contact between the magnetic cores 12 and 22 and the mounting surfaces 14 and 26 by securing the cores 12 and 22 to the mounting surfaces 14 and 26, by, for instance, tightening bolts, 16 and 28, which pass through holes, 15 and 27, in the walls of the polygonal magnetic frame to engage with threaded holes 17 and 29 separately machined in the convex arcuate radially outer surfaces, 13 and 25, of the magnetic cores.

By means of the circular machining which is a principle feature of this invention, continuous machining of all the surfaces to be machined within the magnetic frame is made possible, without the need to accurately reposition the magnetic frame relative to the machining apparatus before machining each separate surface. Additionally, by suitably adjusting the machining radius, the arcuate plane can be made exactly the required size, such that no unnecessary machining is carried out. The time required for the whole process is thus very substantially reduced. Also, accuracy is increased with greater certainty as only one machining operation is carried out to a constant radius, without the possibility of errors due to repositioning of the machining apparatus relative to the magnetic frame being machined.

It goes without saying that although a preferred embodiment of the present invention has been described and illustrated hereinbefore, various changes may be resorted to in the form, details, arrangement and proportion of the parts, as well as in the exact form or sequence of the steps of which the method of the present invention is comprised, without departing from the spirit or scope of the present invention.

In particular, attention should be drawn to the fact that although advantages are deemed to exist in the structure of the magnetic frame of the preferred embodiment where the respective sides of the magnetic frame are connected by mechanical means such as welds, over the constructions of the prior art, the method of circular machining as described in the present invention could equally be employed with regard to prior constructions, either employing a casting mold to cast a magnetic frame either with or without projections on the internal surfaces, or by producing a frame with pieces welded to the inner surfaces to form projecting portions to be circularly machined on the internal surfaces of the magnetic frame.

What we claim is:

1. A method of constructing a dynamoelectric machine comprising, fabricating a tubular frame stator structure made of a magnetic material and having four major sides of equal width and each disposed at an equal distance from a longitudinal axis of the frame, machining the interior surfaces of the four sides in a same single machining operation to machine a concave recess in each inner surface of each side with each concave recess having the surfaces thereof spaced equal radii from the longitudinal axis of the frame so that surfaces of concave recesses are disposed coaxial on a common circle about the longitudinal axis, providing four magnetic polepieces each having a convex mounting surface complementary to each concave recess, and mounting in a fixed position each polepiece disposed in a respective concave recess with the complementary convex mounting surface thereon disposed in a corresponding concave recess.

2. A method of constructing a dynamoelectric machine according to claim 1 in which the polepieces are similar, and each have a concave pole.

3. A method of constructing a dynamoelectric machine according to claim 2, in which the concave pole of each polepiece is positioned at equal radii from said longitudinal axis, whereby poles of said polepieces are disposed coaxial on a common circle having a center at said longitudinal axis.

4. A method of constructing a dynamoelectric machine according to claim 1, in which the four sides are arranged in two pairs with the sides of each pair opposed to each other and parallel.

5. A method of constructing dynamoelectric machine according to claim 3, in which the fabricating of said frame comprises fabricating the frame with four short sides of magnetic material, each disposed between two adjacent major sides, each short side being disposed to subtend an angle of 135° between it and each adjacent major side, and each short side having a magnetic polepiece projecting interiorly of the frame a distance defined by equal radii of the last-mentioned circle.

* * * * *